United States Patent [19]

Schoon

[11] Patent Number: 5,054,893

[45] Date of Patent: Oct. 8, 1991

[54] ELECTRO-OPTIC CELL LINEAR ARRAY

[75] Inventor: David Schoon, Mendota Heights, Minn.

[73] Assignee: Schoonscan, Inc., Mendota Heights, Minn.

[21] Appl. No.: 568,908

[22] Filed: Aug. 17, 1990

[51] Int. Cl.[5] .......................... G02F 1/03; G02F 1/05; G02B 5/30; G03G 15/00
[52] U.S. Cl. .................................. 359/254; 355/200; 359/276
[58] Field of Search ............... 350/379, 380, 392, 356, 350/355

[56] References Cited

U.S. PATENT DOCUMENTS 4,765,721 8/1988 Agostinelli et al. ................ 350/392

FOREIGN PATENT DOCUMENTS 0136016 8/1983 Japan .................................. 350/356
0083013 5/1985 Japan .................................. 350/356

Primary Examiner—Eugene R. LaRoche
Assistant Examiner—Evelyn A. Lester
Attorney, Agent, or Firm—Paul L. Sjoquist

[57] ABSTRACT

An electro-optic cell linear array, such cells being commonly referred to as PLZT cells or Kerr cells, for use in an electro-optic imager wherein the electrode lines are placed at from 15° to 75° relative to the centerline of the array. The advantages of such a configuration are that the electrode lines are not imaged and that adjacent cells have overlapping areas of exposure.

6 Claims, 4 Drawing Sheets

ELECTRO-OPTIC CELL LINEAR ARRAY

BACKGROUND OF THE INVENTION

The present invention relates to imaging devices, and more particularly to imaging devices wherein a plurality of light beams are controlled by light valves.

1. Field of the Invention

Electro-optic cells are devices which can act as light valves, shutters, or modulators. Such devices are sometimes referred to as Kerr cells. They may be composed of a thin wafer of a transparent piezoelectric ceramic material, such as PLZT (lead lanthanium zirconium titanate) wherein thin electrodes are placed on one or both surfaces. The wafer is illuminated with polarized light. Subsequent to passage through the electro-optic cell the light is passed through a second polarizing filter, the axis of polarization of the second filter being perpendicular to that of the first filter. When the PLZT material is not stressed, nearly all of the light is blocked by the second polarizer or analyzer. When a voltage is imposed between two adjacent electrodes on the material's surface, the material bends slightly because of its piezoelectric nature. This bending results in a stress within the material which in turn rotates the vector of polarization of the light passing through the material. By varying the voltage between the electrodes the polarization of light passing through the material can be rotated through an entire 90°, and the resultant light passing through the final polarizing material can be made to go from nearly zero to some maximum.

2. Description of the Prior Art

Linear arrays of such devices have been used in various imaging devices, e.g., xerographic printers. The response time of each cell may be from slightly less than a microsecond to more than 100 microseconds, depending on the type of electrodes used and the type of driver used. Such response times are generally somewhat slower than that of a laser diode or accousto-optic modulator as might be used with a gas laser. However when a plurality of cells, e.g., 10–100 cells, is used, the overall imaging rate may be comparable to or even faster than that which is possible with conventional imaging techniques which use a single laser beam. The cost of such imaging is in some cases much lower than that which is possible with a laser. The electro-optic cells can be used with either a coherent or noncoherent light source, e.g., an ordinary incandescent lamp together with color filters, thus permitting their use in applications where the desired color of light or distribution of colors may not match that of a given laser. This is another advantage for the use of electro-optic cells.

Typically the light passed through the aforementioned assembly of light source, polarizers, and electro-optic cell linear array is focused through a lens and imaged onto a photoreceptive medium, such as a photoconductive drum or a photographic film.

One of the difficulties encountered in the prior art with such devices is that the electrode lines cast shadows which are imaged onto the photoreceptive medium. This leaves thin lines on the image, this being objectionable. This difficulty is sometimes overcome in the prior art by making the electrode lines as thin as possible, and hence below the limit of the optical system and/or the photoreceptor to resolve. This, however, makes their manufacture more difficult. In other cases in the prior art this difficulty is overcome by using very thin, transparent electrodes of evaporated metal. Such electrodes have a high electrical resistance, which then makes the response time of the cells much slower. This also is objectionable.

Another difficulty which is encountered in the prior art is that the number of cells which is desired may exceed that which can be imaged with a single chip wherein the chip contains an array of cells. Adjacent areas of image must then be aligned and discontinuities are visible if any significant mechanical or optical variations are present. These adjacent areas of image may be the result of a plurality of arrays imaging simultaneously and/or from a single array imaging at multiple points in time.

OBJECTS OF THE INVENTION

It is an object of this invention to provide an electro-optic cell linear array which achieves short response time and yet avoids the objectionable image of electrode lines on the image which is produced. It is furthermore an object of this invention to provide an electrode pattern which makes any discontinuity resulting from the joining of images from multiple arrays and/or a single array imaging at multiple points in time less visible.

SUMMARY OF THE INVENTION

An electro-optic cell array wherein an array of electrodes is placed on one or both surfaces of the cell wherein the orientation of the electrode lines is at an angle which is other than 90° relative to the centerline of the array of electrodes. The resultant image of the electrodes on photosensitive media, when used in a conventional scanning system, is blurred so that no record or a minimal record of the electrode pattern is left on said media.

DETAILED DESCRIPTION OF THE PRIOR ART

Figure 1A:
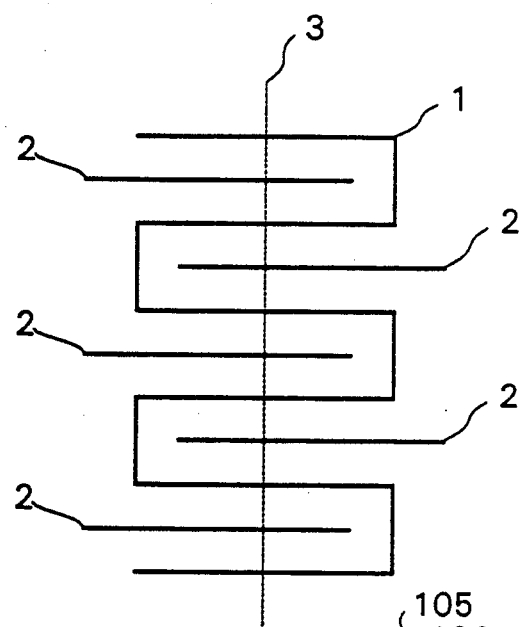
FIG. 1a shows an electrode structure for an electro-optic cell according to the prior art.

According to the prior art, electrodes are placed on surfaces of an electro-optic cell in a pattern similar to that shown in FIG. 1a. The pattern illustrated represents a conductive material placed on one or both surfaces of a suitable material such as PLZT material. Such materials are available from various companies, including Motorola, Inc., Ceramic Products Components Division, Albuquerque, N. Mex. 87113. The black lines in FIG. 1a might represent gold or silver, photographically etched. There is a common electrode 1 and various control electrodes 2. There is a centerline of the array 3 which bisects the active areas. The active areas are the areas between the control electrodes 2 and the nearest portions of the common electrode 1. When a voltage is applied between electrodes 1 and 2, rotation of the vector of polarized light passing through the PLZT chip will occur to an extent which is dependent upon the amount of voltage so imposed.

Figure 1B:
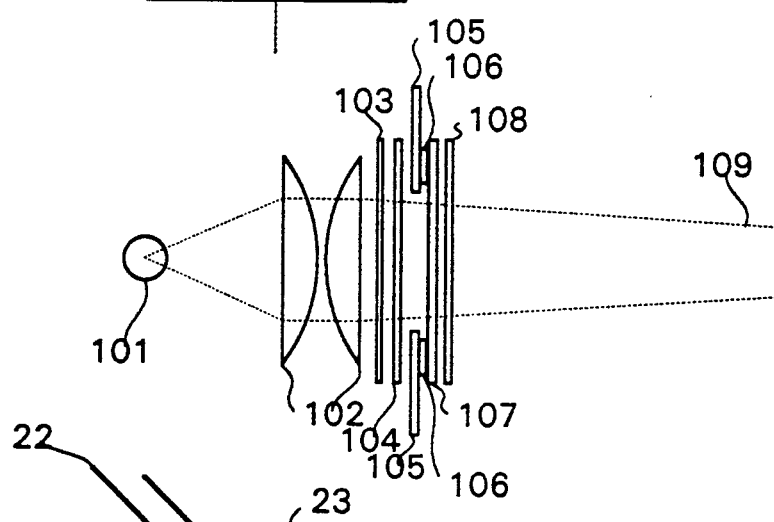
FIG. 1b shows the overall construction for electro-optic cells, according to the prior art.

FIG. 1b shows the optical configuration which is commonly used with such a chip. Light is produced by a lamp 101 and focused or collimated by condensing lenses 102. The light is filtered for various colors and masked by combined mask and filter 103. Then the light is polarized by polarizer 104 prior to passing through PLZT chip 107 and final polarizing material or analyzer 108. The typical rays of emerging light are indicated by 109. Electrical connections are made to the PLZT chip by zebra strips 106 (as available from the Fujipoly Company), which also contact a printed circuit board 105. The electrical signals produced on this printed circuit board are thus conducted to the PLZT chip 107.

Figure 1C:
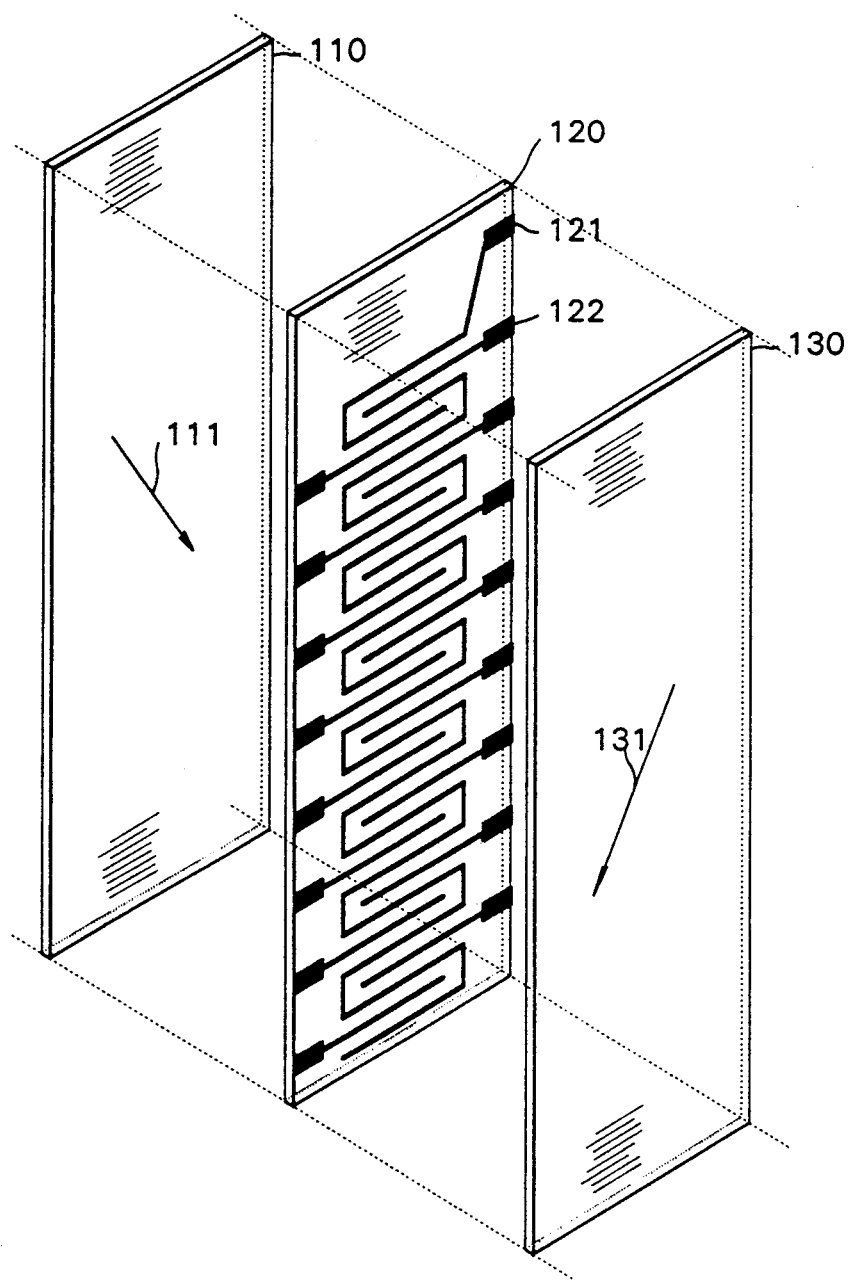
FIG. 1c shows an expanded view of a portion of the objects illustrated in FIG. 1b, again according to the prior art.

Some of these elements are further illustrated in FIG. 1c. These items are polarizing material 110, corresponding to 104 in FIG. 1b; PLZT chip 120, corresponding to 107 in FIG. 1b; and analyzer 130, corresponding to 108 in FIG. 1b. The vectors of polarization are illustrated by arrows 111 and 131. Pad areas for contacting to the Zebra strips are illustrated by common electrode 121 and typical control electrode 122.

The problems with the prior art result from the fact that the imaging of the cells occurs with motion of the image relative to the photoreceptor at right angles to the axis of the array. Thus a thin visible line appears on the image where each electrode casts a shadow, which is a line being parallel to the direction of image movement. This line is avoided in the prior art by one or more of the following:

(1) imaging the array slightly out of focus,
(2) keeping the electrode lines so thin that they cannot be seen, and/or
(3) making the image so small that it is hidden by the graininess of the film or paper.

None of the above approaches is satisfactory. Trying to maintain a certain degree of defocus can make the resultant imaging highly susceptible to minor variations in optical quality and/or placement. Trying to make the electrode lines very thin can result in gaps in the lines such that they do not conduct. This is especially likely if there is any dust present at the time that the electrode pattern is manufactured. If, alternatively, evaporated transparent metal is used for the conductive traces, the resistance of said lines can be so great that the response time of the cell is made unacceptably long. Finally, there are many applications wherein the graininess of the film or paper cannot be predicted. If the user chooses a higher quality of film the electrode lines may become more apparent.

DESCRIPTION OF THE PREFERRED EMBODIMENT

Figure 2:
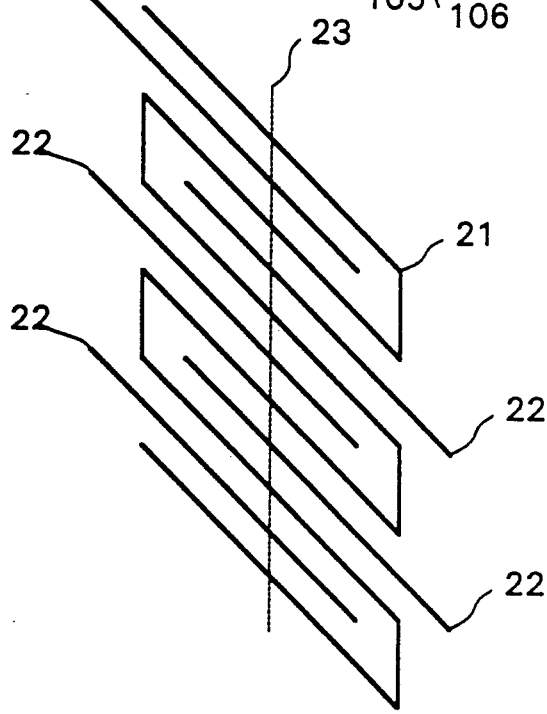
FIG. 2 shows the electrode structure for an electro-optic cell according to the present invention.

The electrode structure of this invention is illustrated in part in FIG. 2. The electrodes are preferably oriented at from 30° to 60° relative to the array axis 23. A common electrode 21 surrounds a portion of each of a plurality of control electrodes 22.

Figure 3:
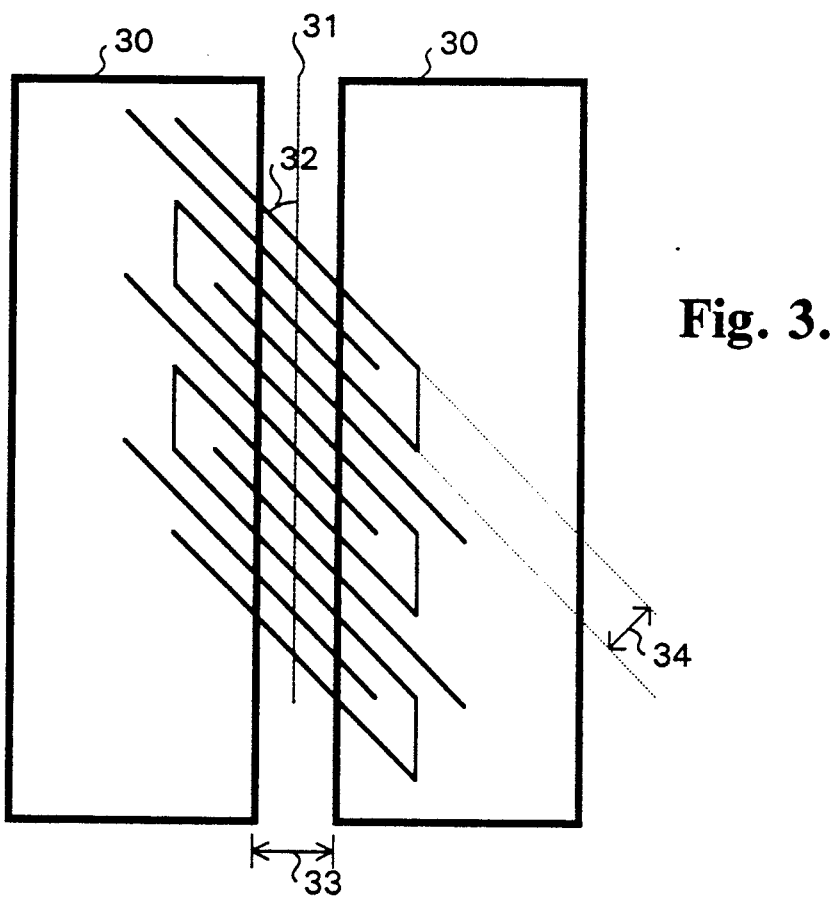
FIG. 3 shows the optical masking which is done in order to limit the optically active areas of the cell, according to the present invention.

This electrode structure is optically masked as illustrated in FIG. 3. The same electrode structure as shown in FIG. 2 is illustrated, but in addition optical masks 30 are shown which restrict the light through the array to the area between each of two such masks. The axis of the array is also indicated 31, which corresponds to axis 23 in FIG. 2 and axis 3 in FIG. 1a. The angle between the electrode lines and the axis is illustrated by arc 32. The distance between the opaque masks is indicated by dimension line 33, and the thickness of a single cell measured perpendicular to electrode lines is illustrated by dimension 34.

The following features are revealed in the structure shown in FIG. 3:

(1) the electrode lines are imaged with an integrated exposure which is more or less uniform across the surface of the photosensitive receptor, and thus no variation in exposure is seen as a result of the electrode lines. It should be understood that this integration of exposure is done with movement of the image of the array in a direction which is perpendicular to the array axis.

(2) the thickness of the electrode lines is of less consequence than it would be if constructed as in FIG. 1 (prior art configuration); therefore the lines can be thicker. Manufacturing of the devices is significantly more reliable and less expensive.

(3) when used in a configuration wherein some overlap between cells is either required or unavoidable, and some misalignment is present, the consequence of such misalignment is less apparent than it would be according to the prior art configuration.

It can be seen that the distance between optical masks might be chosen to be such that if all cells are programmed for identical exposure no variations in exposure across the photoreceptor parallel to the axis of the array would be seen. This condition is achieved when the extremity of cell #n-1 is at the same position parallel to the array axis as the opposite extremity of cell #n+1. Referring to FIG. 3, this condition is satisfied if $$G = t/\cos(A)$$

where

G = gap between opaque masks 30 as indicated by dimension line 33;

A = the angle between electrode lines and the array axis 31 as indicated by arc 32; and t = the cell thickness 34 which extends from one common electrode to the next similar electrode.

Cos = the cosine function.

While other distances G can be chosen according to the present invention, they will not present the same uniformity of exposure which is obtained when the above relationship is used.

Ideally, the angle A between the electrodes and the array axis should be about 45°. For various applications, other angles typically in the range of 30° to 60° can also be made to work well. As the angle becomes too large, above 75°, a very wide gap of dimension G is required to make the integrated exposure uniform. This can be seen by examination of the above equation. As the angle A becomes large, the value of cos(A) becomes small and large values of G, i.e., values of G significantly larger than the distance between cells are resultant. If the gap is narrower than that specified by the above-mentioned equation, the exposure will still be more uniform than it would be according to the prior art, but it would not be optimal. If the gap is significantly wider than the distance between cells, the effective beam size would be quite asymmetrical, and this is usually desirable. This would be seen as an ability to resolve significantly less detail in one direction than in the other.

If an angle is used which is too small, below 15°, the resultant value of G which minimizes variations in exposure becomes much smaller than the distance between cells. Moreover, the percentage of the total area which is covered by electrodes is higher than it would be at higher angles. Both factors would add to make the resultant light flux lower than it would be with a more optimal angle. If the light flux is too low, it might be difficult to get the required degree of exposure of the photosensitive media. Certainly values of G greater than that specified by the equation could be used, but this would be other than optimal.

It should be understood that attempting to image a large area of identical exposure is the condition under which minimizing any discontinuity between bands is particularly important. Under these conditions the human eye is especially able to discern very minor discontinuities in exposure. When large amounts of detail are present, that ability is less in evidence.

In the early days of imaging it was thought that the ability to resolve single pixel lines was particularly important, and hence overlapping exposures in systems such as laser scanners were avoided. As the ability to create systems with finer and finer resolutions was obtained, the value of being able to image single pixel lines became less important and uniformity of exposure became of greater concern. It can be seen that this system would be less able to image single pixel lines than a system designed according to the prior art. This is seen as a small disadvantage and the ability to obtain uniformity of exposure is seen as a more important advantage. Moreover, the ability to image without "scanner signature" or very fine lines parallel to the direction of scanning is very important.

Figure 4:
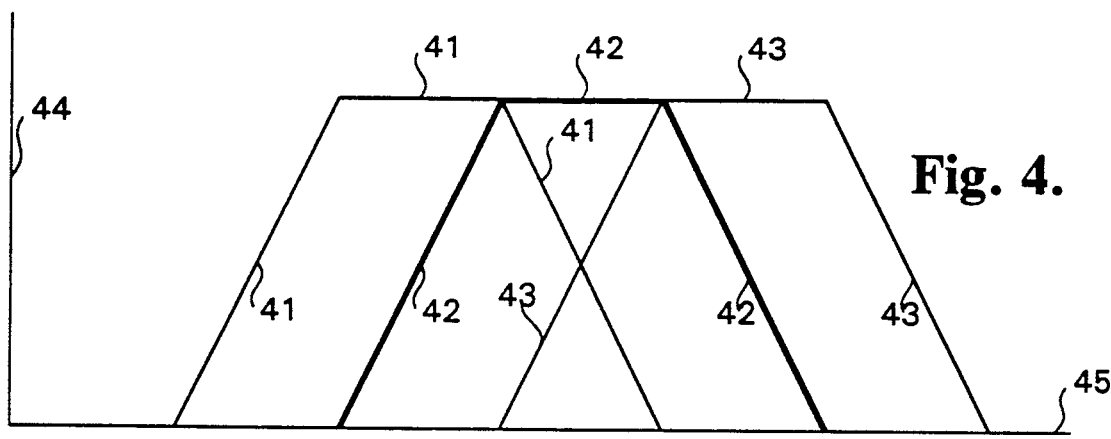
FIG. 4 graphs the relative exposure which is received as a function of distance along the array for a cell and its adjacent cells according to the present invention.

FIG. 4 illustrates the relative integrated exposure at a photoreceptor resulting from various parts of the array if constructed according to the preferred embodiment. This figure is a graphical representation of relative exposure indicated by graph ordinate 44 as a function of distance; this distance being that parallel to the array axis (31 in FIG. 3) and indicated by graph abscissa 45.

The heavier lines 42 illustrate the degree of exposure resulting from a given cell referred to as cell #n, and the lighter lines 41 and 43 illustrate the exposure resulting from adjacent cells. It can be seen from this graph that the exposures from adjacent cells is overlapping. It can also be seen that within curve 42, where exposure from cell #n−1 is decreasing with distance (line 41), exposure from cell #n+1 is increasing. The combined overall exposure over a region, i.e., the sums of contributions from various cells, is thus held constant. The desired condition of being able to image areas with constant exposure without objectionable scan lines being visible is achieved.

Figure 5:
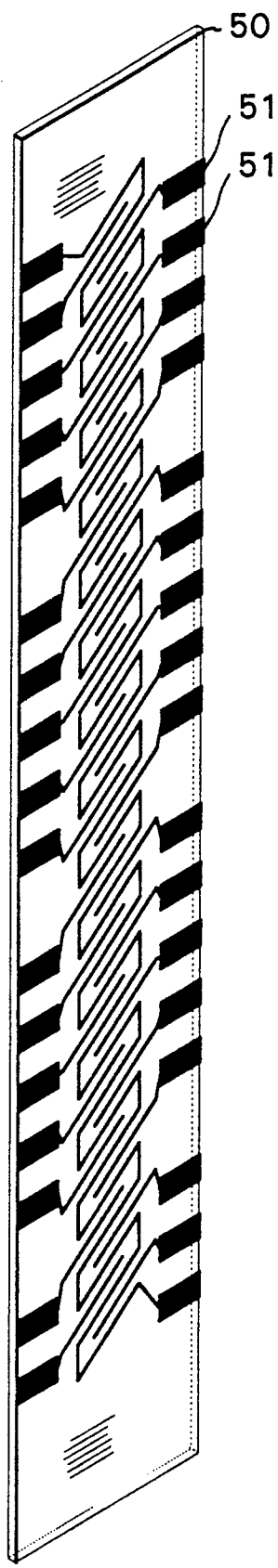
FIG. 5 shows a complete electrode pattern for a 32-element linear array of cells in a completed PLZT chip according to the present invention.

FIG. 5 illustrates a chip designed according to the preferred embodiment. The base material 50 is PLZT material and the electrode structure is gold, photographically etched. Representative pads 51 provide a means of connecting the electrodes to zebra strips which in turn connect this chip to a printed circuit board.

The angle A between the array axis and the electrodes is 45° and the number of cells is 32. The cell thickness t is 0.021". The preferred gap G between opaque elements is 0.030". Along the array axis, the spacing of cells is also 0.030" per cell. The cell is imaged at a magnification ratio of 1/10 to a photoreceptive medium (photographic film) to obtain an addressability on that film of 300 pixels per inch. The overall size of the chip is 0.25"×1.2".

In operation, the chip of FIG. 5 is installed on a scanning device of the type described in my copending U.S. patent application Ser. No. 542,957, filed June 25, 1990, and entitled "Band Imaging Device." The chip is positioned so that the scanning direction is along axis 31 (see FIG. 3), which corresponds to graph abscissa 45 of FIG. 4. As the chip is moved along axis abscissa 45, each of the cells will be exposed according to the graph, resulting in a constant combined overall exposure over any particular region. The desired result is achieved; namely, predefined areas are imaged with constant exposure and without objectionable scan lines being observed.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An electro-optic cell array formed on a piezoelectric material, comprising an array of electrically conductive lines regularly arranged along a piezoelectric surface of said material, said lines intersecting a common axis of said material, and said lines further comprising:
   (a) a first common line having regularly spaced parallel segments intersecting said common axis, and
   (b) a plurality of further lines in parallel alignment with each other and with said common line spaced parallel segments, each of said further lines having a segment intersecting said common axis intermediate common line segments,
   (c) said common line spaced parallel segments and said plurality of further lines parallel segments all being aligned at an angle of 15° to 75° relative to said common axis.

2. The apparatus of claim 1, further comprising a pair of opaque masks positioned parallel to said common axis, each said mask being spaced from said axis by a preselected distance G/2, wherein G is determined by dividing the distance between adjacent common lines by the cosine of the angle between said lines and said common axis.

3. The apparatus of claim 2, wherein the plurality of further lines comprises thirty-two.

4. The apparatus of claim 1, wherein said common line spaced parallel segments and said plurality of further lines' parallel segments are aligned at an angle of substantially 45° relative to said common axis.

5. A method of constructing an electro-optic cell wherein one or both surfaces of a material capable of both piezoelectric behavior and rotation of the vector of polarized light is covered with thin electrically conductive electrodes, and the electrodes define an array of more or less regular cells along a central axis, and each cell is surrounded by a common electrode, and is bisected by a single control electrode, comprising the step of aligning said common electrode and said control electrodes such that the angle between said central axis and said electrodes is at least 15°, but less than 75°.

6. The method according to claim 5, further comprising the step of placing opaque masks in an optical path to either side of said central axis, the distance between said opaque masks being approximately the shortest distance between the outside common electrodes which define the cell, divided by the cosine of the angle between said central axis and said electrodes.

* * * * *